Feb. 17, 1931.  M. BROCHU  1,792,571
DOWEL CUTTING MACHINE
Filed April 23, 1928  5 Sheets-Sheet 1

Inventor
Michael Brochu
By Frank E. Livrance, Jr.
Attorney

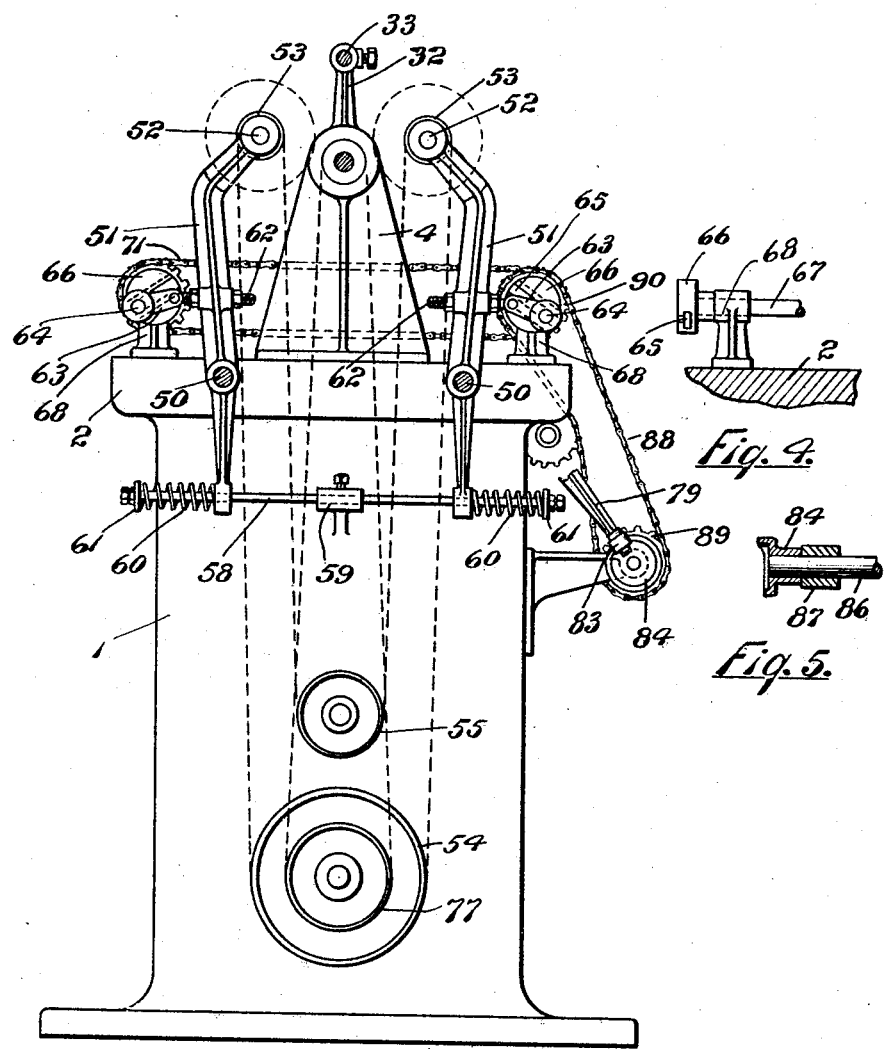

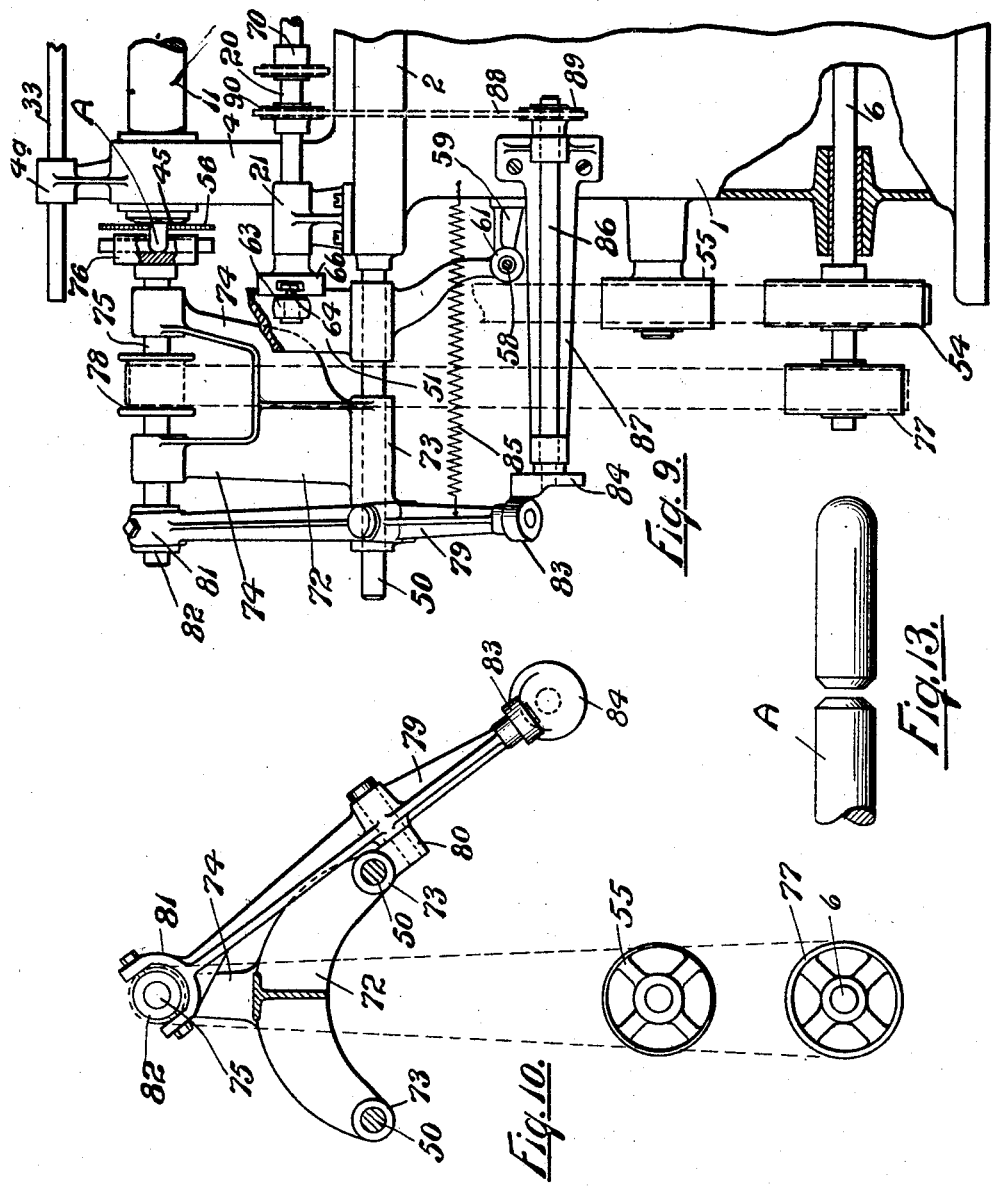

Patented Feb. 17, 1931

1,792,571

UNITED STATES PATENT OFFICE

MICHAEL BROCHU, OF GRAND RAPIDS, MICHIGAN, ASSIGNOR TO DESPRES DOWEL MFG. CO., OF GRAND RAPIDS, MICHIGAN, A COPARTNERSHIP COMPOSED OF MARCEL DESPRES AND STANLEY J. DESPRES

DOWEL-CUTTING MACHINE

Application filed April 23, 1928. Serial No. 272,059.

This invention relates to improvements in dowel cutting machines, being particularly concerned in improvements in the construction shown in United States Patent No. 992,845, issued May 23, 1911. It is an object and purpose of the present invention to provide an automatic mechanism for cutting dowel rods or sticks to predetermined lengths and so improve the construction of the machine shown and described in said patent above noted that the quantity of dowels produced may be greatly increased, in fact, doubled with my invention. A further object and purpose of the invention is to provide means for automatically shaping one end of each dowel cut to any desired form or shape. Many other objects and purposes than those stated specifically will appear fully and in detail as understanding of the invention is had from the following description taken in connection with the accompanying drawings, in which;

Fig. 3 is an end elevation, parts being shown in section and removed for clearness of disclosure.

Fig. 4 is a fragmentary side view of a detail referring to the pitman which operates the saw carrying arms.

Fig. 5 is a fragmentary longitudinal section of the cam construction which moves the shaft carrying the shaping head for engaging against and forming the ends of the dowels.

Fig. 9 is a fragmentary side elevation similar to Fig. 1 but showing one end only of the machine and disclosing the lower end of the saw supporting lever of somewhat different shape, the dowel end shaping and forming mechanism being applied thereto.

Fig. 10 is an end view with parts in section showing the essential operating devices for said dowel end forming mechanism.

Fig. 11 is a fragmentary enlarged vertical section taken through the guiding head located at the rear end of the dowel feeding mechanism.

Fig. 12 is an end elevation with parts in section showing the device used to steady and hold the projecting end of the dowel rod when it is being operated upon by the saws to cut a dowel therefrom when the dowel end forming mechanism illustrated in Figs. 9 and 10 is not used on the machine.

Fig. 13 illustrates one end of the dowel rod with a complete dowel cut therefrom and one end of said complete dowel shaped by a cutter head of the machine.

Like reference characters refer to like parts in the different views of the drawings.

Figure 1:
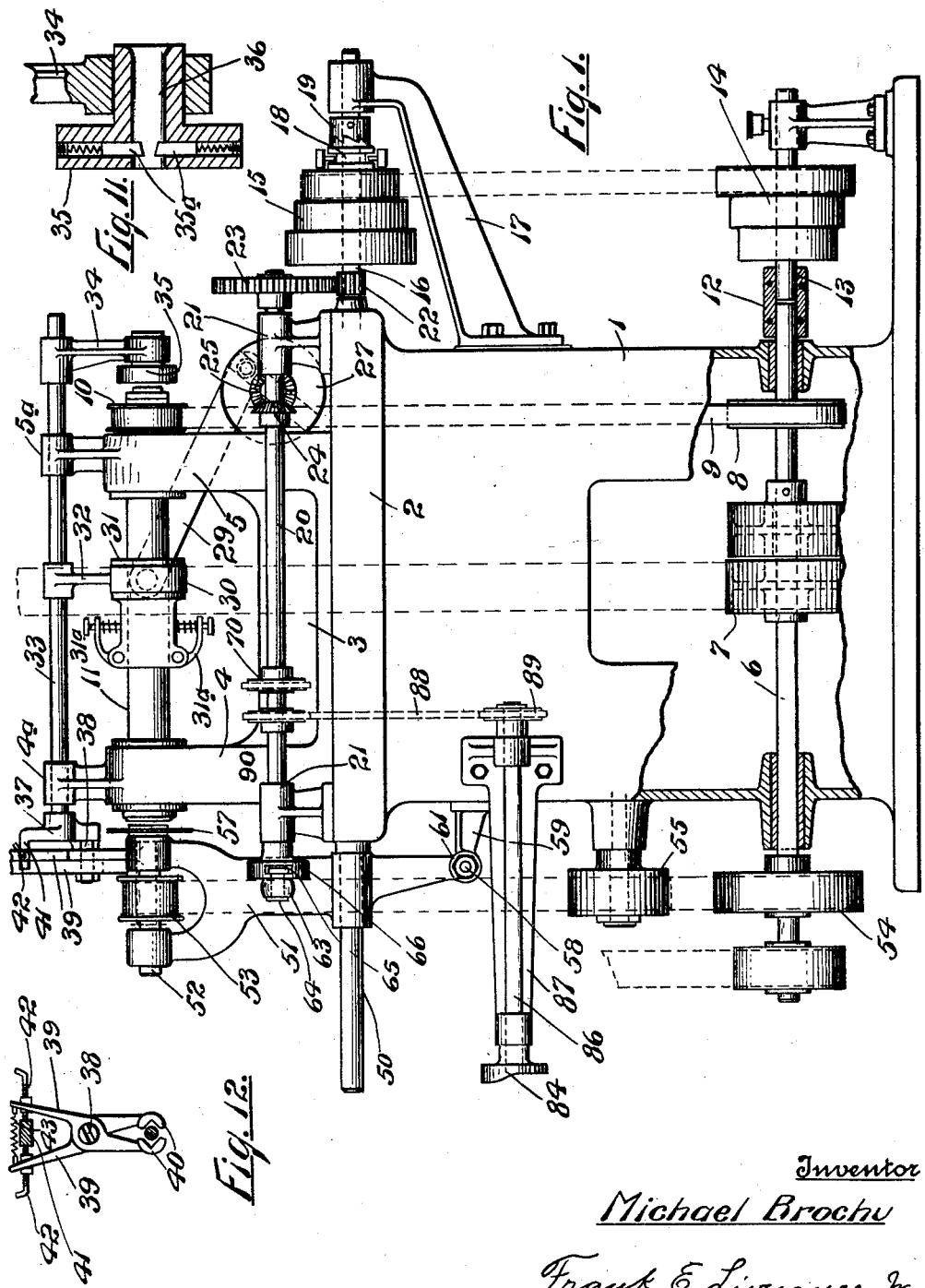
Fig. 1 is a side elevation, with parts shown in section, of my improved dowel cutting machine.

The machine includes in its construction a main support 1 made as a casting, and at the upper end of which is a horizontal table 2. A bracket 3 including spaced apart upwardly extending arms 4 and 5 is secured to and lies above the table 2. Adjacent the base of the support a drive shaft 6 is rotatably mounted which may be driven from any suitable line shafting or other source of power by a belt passing around the pulley 7. A drive pulley 8 is mounted on the shaft 6 and through a belt 9 passing around the same and around a pulley 10 fixed at the end of a hollow mandrel 11, said mandrel is driven. The mandrel is rotatably mounted in bearings in the arms 4 and 5 of the bracket 3 as shown, and is continuously rotated at all times that the machine is in operation.

A friction coupling 12 couples the shaft 6 with a short shaft 13 mounted in alignment therewith. A cone pully 14 is secured to the shaft 13 and is adapted to drive a similar pulley 15 loosely mounted on a shaft 16 disposed between one end of the table 2 and a bearing formed at the upper end of a bracket 17 fastened to the support 1 as shown in Fig. 1. The pulley 15 may be connected with the shaft 16 by moving one clutch member 18 attached to said pulley 15 into engagement with an associated clutch member 19 pinned to the shaft 16, clutch member 18 being moved by any suitable form of lever indicated in Fig. 2. A shaft 20 is disposed horizontally a short distance above and at one side of the table 2, being mounted in bearings formed at the upper ends of brackets 21 which are attached to the table. A pinion 22 on the shaft 16 meshes with a gear 23 fixed at the end of shaft 20 and whenever shaft 16 is driven it is apparent that shaft 20 is likewise driven but at a reduced speed. The friction coupling at 12 permits its slipping with respect to the shafts 6 and 13 should anything occur in the operation of the machine which interposes a resistance to its operation greater than the grip of the coupling on the shafts. This is an insurance against breakage.

Figure 2:
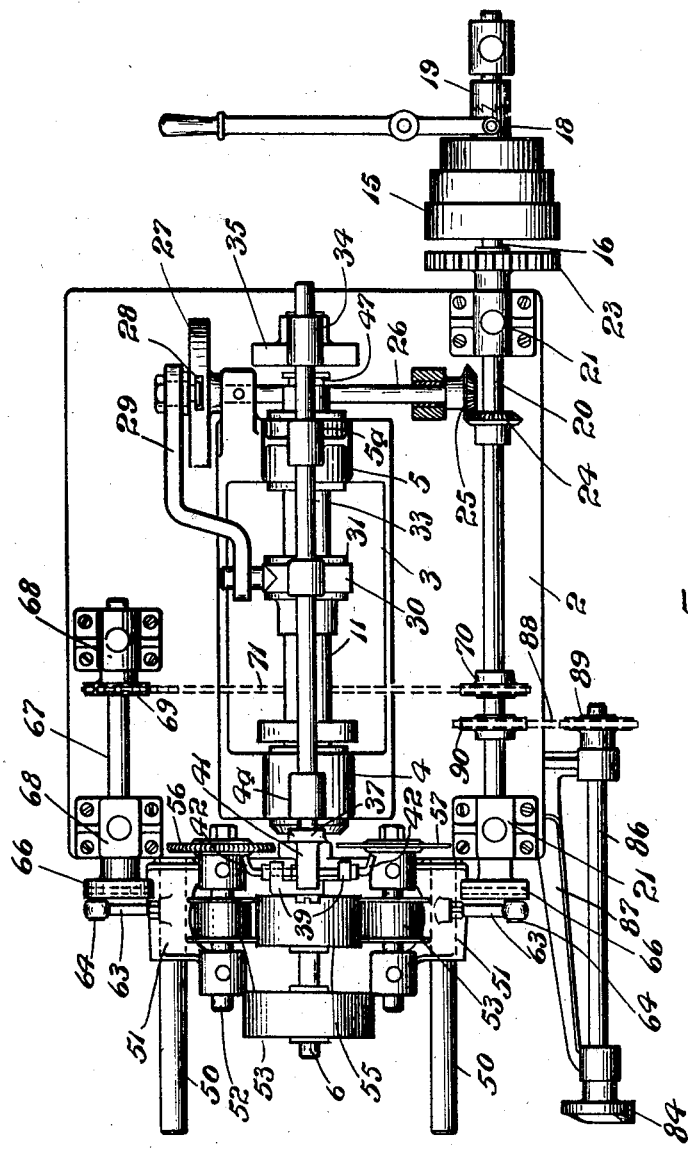
Fig. 2 is a plan view thereof.
Figure 6:
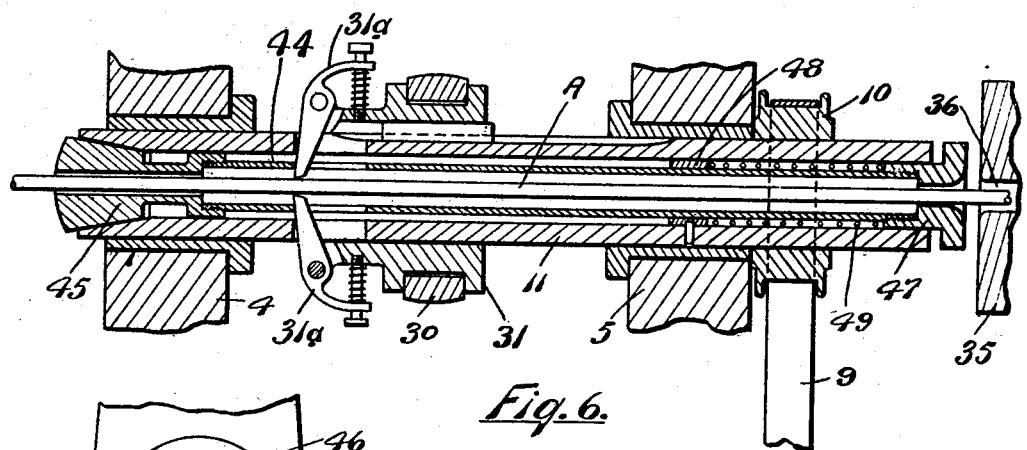
Fig. 6 is an enlarged vertical section taken through the dowel rod feeding mechanism.
Figure 7:
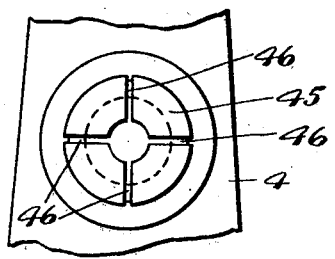
Fig. 7 is a fragmentary enlarged end elevation showing the gripping head at one end of said mechanism.
Figure 8:
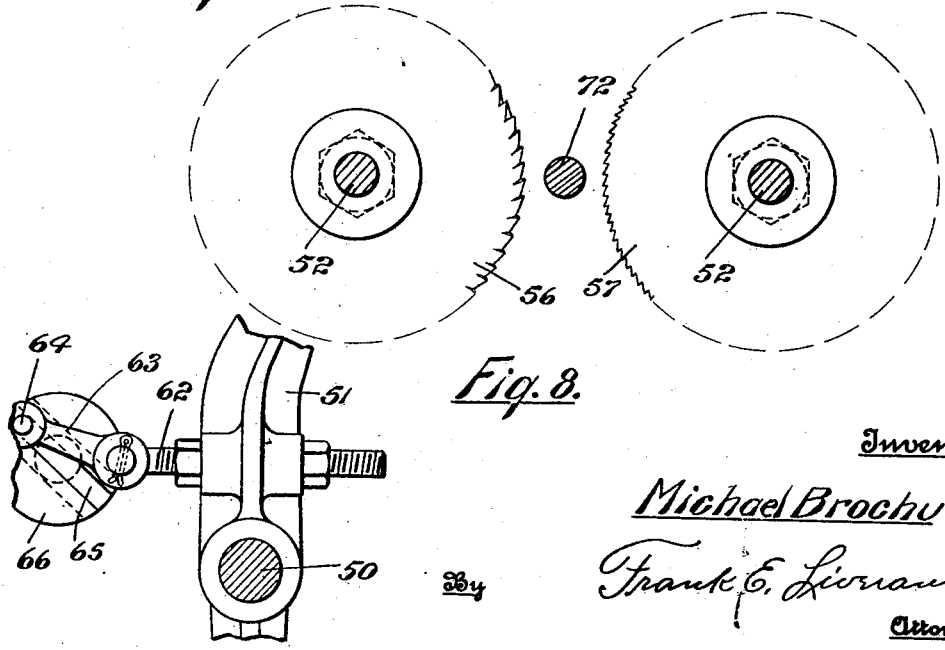
Fig. 8 is a fragmentary enlarged side elevation of the dowel cut off mechanism.

A beveled pinion 24 on shaft 20 drives a similar pinion 25 on a shaft 26 disposed at right angles to shaft 20 as shown in Fig. 2, and mounted in suitable bearings a short distance above the table 2. At the opposite end of shaft 26, a pitman wheel 27 is secured in which a T-shaped slot 28 is cut for the reception of a securing block which passes through one end of and connects a pitman rod 29 to the wheel 27. The opposite end of the rod 29 has connection with a collar 30 loosely mounted around a sleeve 31 splined on and rotatable with the mandrel 11. Spring actuated fingers 31a are pivotally mounted on the sleeve 31 and pass through slots in the mandrel 11, this construction being similar in all respects to the feed finger construction shown in the patent on dowel cutting machine to which reference has been made above. It is apparent that with each revolution of shaft 26 the sleeve 31 is moved back and forth on the mandrel 11 and the feed fingers 31a operated back and forth to feed the dowel rod as will later appear.

A post 32 extends upwardly from the collar 30 and is formed with a guide sleeve at its upper end through which a horizontal rod 33 loosely passes. This rod adjacent its ends passes through similar sleeves 4a and 5a made at the upper end of extensions to the arms 4 and 5. The rod 33 is fixed in position with respect to the sleeves 4a and 5a but the sleeve at the upper end of the extension 32 moves freely on the rod. A bracket 34 is fastened to the rear end of the rod 33 and depends therefrom, being formed with a bearing at its lower end in which a head 35 is rotatably mounted. This head has an opening 36 therethrough for the passage of the dowel rod and spring actuated retaining fingers 35a project inwardly into said openings to engage against the rod and prevent its return after once being inserted through the opening. See Fig. 11.

At the front end of the rod 33 a head 37 is secured from which a pin 38 extends forward serving as a pivot on which two levers 39 are pivotally mounted, the same crossing each other and being formed at their lower ends in front of the front end of the mandrel 11 with jaws 40 between which the dowel rod passes. The head 37 is provided with an upwardly turned finger 41 which passes between the upper ends of the levers 39 and against which the ends of adjusting screws 42 threaded through levers 39 bear as shown in Fig. 12. The upper ends of the levers 39 are normally drawn toward each other by a spring 43 until stopped by the engagement of screws 42 against the finger 41.

Within the mandrel 11 a sleeve 44 of smaller diameter is positioned, having threaded connection at its front end with a head 45 which has a longitudinal passage therethrough and which is divided by a plurality of radial slots 46, four in number in the illustration, into a plurality of segments. The outer sides of the head 45 are tapered and are adapted to fit against a tapered seat made in the front end of the mandrel 11. At its rear end the inner sleeve 44 is connected with a head 47 which has a longitudinal passage therethrough for the passage of the dowel rod. A collar 48 is located within the mandrel 11 and around the sleeve 44, being fixed to the mandrel, and between this collar and the head 47 a coiled compression spring 49 is placed.

Two spaced apart rods 50 project from the front end of the table 2 on each of which a lever 51 is pivotally mounted between its ends. The upper end of each lever is forked and has a shaft 52 mounted in bearings on the forks, each shaft being provided with a pulley 53. A drive pulley 54 is secured adjacent the front end of the drive shaft 6 and a belt is designed to go around the same over the pulleys 53 and around an idle pulley 55 so that both shafts are driven simultaneously. One of the shafts 52 is equipped with a grooving saw 56 and the other with a cut-off saw 57 at the inner ends thereof.

A rod 58 is carried by a bracket 59 formed integral with the support 1, said rod extending to each side of the bracket and passing loosely through the lower end of each of the levers 51. A coiled spring is placed around the rod 58 adjacent each end thereof, being disposed between the lower end of each of the levers 51 and a washer 61 located at each end of rod 58. At a distance above each pivot rod 50, a connecting rod 62 is adjustably attached to each lever 51 and through the medium of a pitman rod 63 each rod 62 is connected with a block 64 adjustably mounted in a T-slot 65 in a pitman wheel 66, one of which wheels is fixed at the front end of shaft 20 while the other is similarly fixed at the front end of a short shaft 67 mounted at the opposite side of the table 2 in bearings 68. The shaft 67 has a sprocket wheel 69 mounted thereon and shaft 20 a similar sprocket wheel 70 around which wheels a chain 71 passes for driving said shaft 67 from it at the same speed as shaft 20.

In the operation of the machine so far described, a dowel rod A of desired diameter is passed through the passage 36 in head 35, through the heads 47 and 45 in mandrel 11 and between the fingers 35a and 31a. With each cycle of the machine the sleeve 31 has a complete reciprocatory movement and on its movement in a forward direction the rod A is carried forward a predetermined distance. This distance may be regulated by adjusting the block in slot 28 of wheel 27 so as to give a greater or less throw as desired. On the return movement fingers 31a slide freely over the rod A and the rod is held from return by the grip of head 45 thereon. This grip action is occasioned by the pressure of spring 49 tending to move sleeve 44 to the rear and bring the tapered sides of the head 45 against the tapered seat in the mandrel 11. On the forward movement of the feed fingers, however, the head does not hold the rod A against the movement by reason of the fact that any tendency to hold will cause a forward movement of the head 45 and attached sleeve 44 with a consequent slight compression of spring 49, the movement being sufficient only to permit expansion of the sectors of head 45 and a free passage of the rod A. This construction permits an exact centering of the rod but allows the ready and free passage of the rod in one direction even though there are irregularities in the surface of the rod and in the cross sectional diameter thereof. The fingers 35a hold the next succeeding dowel rod against any tendency to come back after the time that fingers 31a have become engaged therewith but before the next succeeding rod has reached the head 45.

When the front end of a dowel rod A passes from the front end of the mandrel 11 and head 45, it is carried between the jaws 40 of levers 39 which are adjusted to be open sufficiently to allow its free passage but with no room to spare. The front end of the rod is accordingly held securely so that it may be acted upon by the grooving and cut-off saws 56 and 57.

The rotation of shafts 20 and 67 with a corresponding rotation of pitman wheels 66 oscillates levers 51 about the axes of rods 50 to bring saws 56 and 57 toward the rod and moving the same away from the rod simultaneously. The lever carrying the cut-off saw 57 is set to pass said saw inwardly farther than the grooving saw is permitted to pass, that is, the grooving saw engages against the dowel and of itself merely cuts a groove around the dowel rod extending partly inward toward the central axis of the rod, while the cut-off saw moves in and cuts to the central axis of the rod. As the rod is continuously rotated a dowel is cut off with each inward movement of the cut-off saw.

Springs 60 are of utility in taking up any lost motion and eliminating any vibration liable to occur from the pitman construction.

By reason of the simultaneous inward and outward movements of the grooving and cut-off saw, it is possible to obtain a production substantially twice that of the machine shown in the patent to which reference has been made above and in which the dowel rod must be held stationary during a period while the grooving saw comes to it, grooves the same, moves out of the way and the cut-off saw comes to it and cuts the dowel. The present construction permits a speeding up of production to the extent that one hundred percent more dowels can be made than with the construction shown in the patent above noted and which I have used for several years past.

In Figs. 9 and 10 I have shown a construction adapted to be applied to the machine and which is used to shape the outer end of the dowel rod, before a dowel is cut off, to any desired form in which instance the construction comprising the head 37 and the mechanism attached thereto is not used. This attachment consists of a bracket 72 provided with sleeves 73 which are adapted to be passed over and secured on the supporting rods 50. A fork 74 extends upwardly from the bracket 72, the arms of the fork being formed with bearings to carry a shaft 75 equipped at its inner end with a cutting head 76 having suitable cutting tools mounted thereon for the shaping of one end of each dowel. These tools may be of different forms so as to cut the dowel differently as desired and the heads may be detachable from the ends of shaft 75 for interchangeability. It is sometimes desirable to form one end of the dowel, or in cases where the cut-off and shaped rod is used for other purposes than a dowel, differently than a grooving saw is adapted to shape, as for example the rounded end illustrated in Fig. 13, and in such cases the grooving saw, being present in the machine, is permitted to first roughly shape the end of the dowel after which the cutters in the cutting head act upon the end of the dowel to shape it to the desired form. Furthermore, these cutters in the cutting head act only on one end of the dowel and it is frequently desired to have one end beveled as is accomplished by the grooving cutter while the other end is otherwise shaped by the cutting head. On the front end of drive shaft 6 a drive pulley 77 is secured around which and a pulley 78 on the shaft 75 a belt may pass to drive shaft 75 at high speed.

A lever 79 is pivotally mounted between its ends on a boss 80 cast integral with the bracket 72. The upper end of said lever is forked, as indicated at 81, the arms thereof passing on opposite sides of the front end of shaft 75 and having connection to a sleeve 82 rotatably mounted on but connected with the shaft 75. The lower end of lever 79 is equipped with a roller 83 which bears against a cam 84 being held thereagainst by a spring 85. Cam 84 is fixed at the front end of a shaft 86 mounted horizontally in bearings formed on a supporting bracket 87 which is attached to the main support 1. Shaft 86 is driven from the shaft 20 by a sprocket chain 88 passing around a wheel 89 on shaft 86 and a similar wheel 90 on shaft 20. The sprocket wheels are of the same size so that with each revolution of shaft 20 there is a revolution of shaft 86, an oscillation of lever 79 and a reciprocation of shaft 75 to move the head 76 in and out with respect to the end of the mandrel 11.

When the dowel rod is fed forward by the fingers 31a from the front end of the mandrel its front end is carried to head 76 and simultaneously with the movement of the grooving and cut-off saws toward the dowel rod, head 76 is moved inwardly and engages with the end of the dowel rod A, serving to support the same during the action of the saws and at the same time forming and shaping the front end of the dowel which is being cut from the rod. The head 76 holds the dowel against movement while it is being cut from the rod and, accordingly, it is not necessary to use the levers 39 with jaws 40. When the saws move away from the dowel rod head 76 also moves away freeing the dowel which has been cut off and permitting it to drop by gravity to any suitable receptacle.

The construction described is of a machine particularly practical and efficient and one with which dowels can be produced with great rapidity. It is primarily a machine designed to commercially produce dowels at the greatest possible speed. In practice the machine has accomplished this rapid production and at a rate double that of the machine shown in the patent above referred to which I have used for several years past and of which I am a joint inventor. It is to be realized that many variations in constructive detail may be resorted to without departing from the invention and I, accordingly, consider myself entitled to all modifications of structure which fall within the scope of the appended claims defining the invention.

I claim:

1. A dowel cutting machine comprising a tubular mandrel having a tapered seat in one end provided with slots in its sides, a tube similarly provided with slots in its sides located lengthwise of the mandrel, a collar located around the tube within the mandrel and attached thereto, a head having a central passage therethrough secured to the rear end of the tube, a compression spring between the collar and said head, a second head attached to the front end of the tube and formed with a longitudinal passage therethrough and cut into a plurality of segments, the outer sides of which are tapered to fit the tapered seat in the mandrel, and means including spring fingers slidably mounted on the mandrel, said fingers passing through the slots in said mandrel and tube, substantially as described.

2. A dowel cutting machine comprising a tubular mandrel having longitudinal slots in opposite sides and provided with a tapered seat at one end, means for rotating the mandrel, a tube located within the mandrel provided with slots in opposite sides in conjunction with the slots in the mandrel, a head attached to the front end of the tube having a longitudinal passage therethrough and formed with a plurality of segments having tapered sides to fit the tapered seat in the mandrel, a sleeve slidable on the mandrel, spring actuated fingers mounted on the sleeve and passing through the slots in said mandrel and tube, and means normally tending to move the sleeve in one direction to thereby bring the tapered sides of the head against the tapered seat in the mandrel, substantially as described.

3. A construction containing the elements defined in combination in claim 2 combined with a guide head located back of the mandrel at the end thereof opposite to that which contains the tapered seat, said head having a longitudinal passage therethrough in alignment with the axis of the mandrel, and spring actuated fingers extending into said head and formed at their inner ends to permit the passage of a dowel rod into the tube within the mandrel but prevent its return movement, substantially as described.

4. A dowel cutting machine comprising a rotatably mounted mandrel through which a dowel is adapted to be fed, means for feeding said rod step by step through and beyond said mandrel, a shaft provided with a cutting head located in front of the mandrel, means for mounting said shaft for longitudinal movement, means for cutting a dowel from the rod at a point between said head and mandrel and means for moving said shaft and attached head toward the mandrel simultaneously with the cutting of the dowel therefrom, the head engaging with the end of the rod to hold the same and also acting thereon to cut it to desired form, substantially as described.

In testimony whereof I affix my signature.

MICHAEL BROCHU.